2,725,391

PROPENYL DERIVATIVES OF 2,2-DIMETHYL-5-HYDROXYCOUMARAN AS ANTIOXIDANTS

Alan Bell, M. B. Knowles, and Clarence E. Tholstrup, Kingsport, Tenn., assignors to Eastman Kodak Company, Rochester, N. Y., a corporation of New Jersey No Drawing. Application April 7, 1954, Serial No. 421,674

10 Claims. (Cl. 260—398.5)

This invention relates to the stabilization of fats, oils, or other organic materials subject to deterioration employing one or more related compounds as an antioxidant, namely 2,2-dimethyl-5-hydroxy-$x$-(1-propenyl)-coumaran.

This application is a continuation in part of our co-pending application filed May 31, 1951, Serial No. 229,282, now United States Patent No. 2,682,474 dated June 29, 1954.

Various derivatives of 2,2-dimethyl-5-hydroxycoumaran are known wherein alkyl, aryl and cycloaliphatic radicals are substituted in the 6-position. Such compounds are said to be suitable for the stabilization of cracked gasoline and other related organic compounds although it appears that they can also be used for the stabilization of fats, oils or the like.

We have now found that a 1-propenyl substituent in what is probably the 6-position produces an unexpectedly superior and quite valuable antioxidant for organic materials, especially fats and oils. This compound probably has the following structural formula:

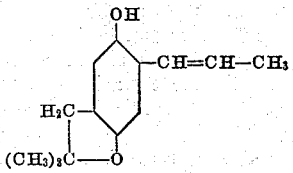

It is believed significant to note that the 1-propenyl radical in the 6-position contains a double bond in conjugated relationship to the double bond in the benzene ring. This is one of the distinguishing characteristics of the propenyl derivatives covered by this application, the parent application and our application Serial No. 229,281 filed on May 31, 1951, now United States Patent No. 2,682,563 dated June 29, 1954. It is believed that this conjugated relationship of the double bonds is in a large measure responsible for the unusual antioxidant properties of 2,2-dimethyl-5-hydroxy-$x$-(1-propenyl)coumaran.

The discovery of the existence of improved antioxidant properties which probably results from the above-described conjugated double bond relationship is unexpected inasmuch as the antioxidant properties created by various nuclear substituents on compounds such as coumaran is but little understood. It is believed advantageous that this antioxidant compound be employed in monomeric form; however, the presence of a certain amount of low polymer is probably not especially objectionable. The propenyl derivative with which this application is concerned is a relatively stable monomeric compound (or compound mixture) which does not readily polymerize. This compound is clearly distinct from the corresponding allyl isomer. If the 1-propenyl radical of this antioxidant of this invention is replaced by an allyl or by a tertiary butyl radical the protection factor in lard at a concentration of 0.02% is reduced to about one half or less as indicated by tests which have been conducted. It is therefore apparent that the coumaran derivatives of this invention have greatly improved antioxidant properties by virtue of the presence of the 1-propenyl radical.

It is an object of our invention to provide a novel antioxidant possessing improved properties which are particularly useful in the stabilization of fats and oils. Another object of our invention is to provide a process for the stabilization of such fats and oils employing 2,2-dimethyl-5-hydroxy-$x$-(1-propenyl)coumaran as the novel antioxidant. Other objects are apparent elsewhere in the specification.

Although the applicants believe that the structural formula of the antioxidant covered by this invention is that which has been described above, it is quite possible that the 1-propenyl radical may be in the 4-position instead of the 6-position, although this would not appear most probable. Nevertheless, the applicants do not wish to be limited to the structural configuration depicted above. The antioxidant of this invention can be more generically depicted for the following structural formula:

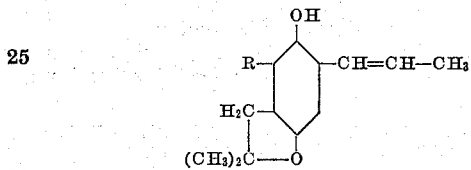

wherein R represents a substituent selected from the group consisting of a hydrogen atom and a 1-propenyl radical. This antioxidant is generically referred to as 2,2-dimethyl-5-hydroxy-$x$-(1-propenyl)coumaran. When R is a hydrogen atom then the compound depicted is 2,2-dimethyl-5-hydroxy-6-propenylcoumaran.

The coumaran derivative (or derivatives) set forth in the preceding structural formula can be prepared as described in the example set forth below. It is obvious that the product may be a combination of chemical compounds which are derivatives of 2,2-dimethyl-5-hydroxycoumaran containing one or two propenyl substituents in the 4-and/or the 6-positions, that is, the product may contain a 1-propenyl radical in the 4-position as well as in the 6-position or it may be so substituted in both positions. In order to insure that the terminology of this application covers the applicants' contribution to the art, the antioxidant product is designated as 2,2-dimethyl-5-hydroxy-$x$-(1-propenyl)coumaran where $x$ represents either or both of the 4 or 6 positions (the 1-propenyl radical obviously appearing twice in the event that $x$ represents both positions).

*Example.*—2,2-dimethyl-5-hydroxy-$x$-(1-propenyl)-coumaran

It has also been found that cyclic ethers having the following formula are remarkably potent antioxidants:

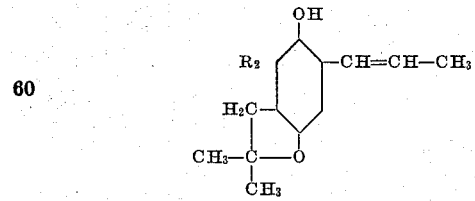

wherein $R_2$ is the same as defined hereinabove which includes a 1-propenyl radical. When $R_2$ is a hydrogen atom the compound is 2,2-dimethyl-5-hydroxy-6-(1-propenyl)coumaran. If the 1-propenyl radical of this compound is replaced by an allyl or a tert. butyl radical, the protection factor in lard at a concentration of 0.02% is reduced to about one half or less as indicated by certain tests that have been conducted. Thus, these cyclic ethers show greatly improved antioxidant properties when the 1-propenyl radical is present as compared to those defined in U. S. Patent No. 2,535,058 wherein the position occupied by the 1-propenyl radical is occupied by a hydrocarbon radical such as a tertiary butyl radical. The cyclic ether in the formula set forth above can be prepared as set forth in the example below; however, it has not yet been determined with certainty that the 1-propenyl radical is in the 6-position. Some of the product may contain this radical in the 4-position as well as in the 6-position or may be disubstituted in both positions. Thus the product prepared according to the following procedure can be termed 2,2-dimethyl-5-hydroxy-$x$-(1-propenyl)coumaran where $x$ represents either or both of the 4 and 6 positions:

STEP 1.—PREPARATION OF ALLYL ETHER OF 2,2-DIMETHYL-5-HYDROXY COUMARAN

To a solution of 117 grams (0.7 mole) of 2,2-dimethyl-5-hydroxy coumaran and 36 grams (0.8 mole) of sodium hydroxide in 250 cc. of methanol and 70 cc. of water, 84 grams (1.1 moles) of allyl chloride was added. The mixture was stirred and refluxed for four hours. At the end of this period, the reaction mixture was added to 2 volumes of ice water, and the organic layer extracted with ether. The ether extract was washed twice with 5 percent aqueous sodium hydroxide solution and then four times with water. The ether solution was dried over calcium chloride, and the solvent then removed by heating on a steam plate.

STEP 2.—REARRANGEMENT OF ALLYL ETHER OF 2,2-DIMETHYL-5-HYDROXY COUMARAN

The crude allyl ether prepared in Step 1 was mixed with 40 grams of dimethylaniline and the solution heated at 230–235° C. for 45 minutes. After cooling to room temperature, 150 cc. of ether was added and the dimethylaniline was removed by extracting with dilute hydrochloric acid. The ether solution was washed with water and then extracted with two 300-cc. portions of 10 percent aqueous sodium hydroxide solution. The ether solution, after washing and then drying over calcium chloride, was evaporated to yield 50 grams of 2,2-dimethyl-5-allyloxy coumaran which had not rearranged.

The aqueous extract was acidified and extracted with ether. The ether extract was washed twice with water, dried over calcium chloride, and the ether stripped off by heating on a steam plate. The crude product was distilled to give 71 grams of an oil and 7 grams of residue. The physical constants determined for the 2,2-dimethyl-5-hydroxy-$x$-allyl coumaran were as follows: B. P.: 132–135° C. at 2 mm.; $n_D^{20}$=1.5462.

STEP 3.—PREPARATION OF 2,2-DIMETHYL-5-HYDROXY-X-PROPENYL COUMARAN

Sixty grams of potassium hydroxide pellets and 30 cc. of water were stirred and heated to 130° C. The reaction vessel was flushed out with nitrogen and then 30 grams of 2,2-dimethyl-5-hydroxy-$x$-allyl coumaran was added. The mixture was stirred and heated at 160° C. for 30 minutes. The reaction product was immediately poured onto 150 cc. of ice water and the mixture was acidified with dilute hydrochloric acid. The product was extracted into a 1:1 ether-benzene mixture, the organic solution washed three times with aqueous sodium chloride solution, and then dried over calcium chloride. After removing the solvent, the propenyl derivative was distilled at 110–118° C. (0.1 mm.); $n_D^{20}$ 1.5710.

It is believed quite clear that the process outlined in the preceding steps described under the example could be suitably modified by those skilled in the art to produce similar results. It is believed evident that the 1-propenyl derivatives of 2,2-dimethyl-5-hydroxycoumaran can be prepared from the allyl analogs of these compounds by heating in the presence of any alkali metal hydroxide solution in water or other inert polar medium such as ethylene glycol under an inert atmosphere at an elevated temperature followed by cooling, neutralization and separation of the product which can be further purified by any other means such as by distillation at a greatly reduced pressure or by recrystallization from an inert solvent such as hexane. Temperatures which can be advantageously employed during the heating step range from about 110° C. to 190° C.

The employment of 2,2-dimethyl-5-hydroxy-$x$-(1-propenyl) coumaran as an antioxidant for fats and oils has been indicated above. When so employed, fractions of a percent of such compounds can be incorporated into such materials as cottonseed oil, peanut oil, etc. by mixing the antioxidant with the fats or oils whereby a solution or dispersion of the antioxidant in the substrate is obtained. Alternatively the antioxidant can be blended with suitable solvents to form an antioxidant solution employing solvents well known in the art. Such antioxidant solutions can be more readily dissolved in the fat or oil to be stabilized with less necessity for prolonged mixing of the fat or oil than when the undissolved antioxidant is employed.

Synergists can be admixed with the fats or oils along with the undissolved antioxidant compounds of this invention or, in order to facilitate the incorporation of the antioxidant or synergist into the fat or oil, they can both be dissolved in a suitable solvent which is inert insofar as concerns both the antioxidant and the synergist components in the finally prepared and stabilized fats or oils.

Examples of synergists which can be employed include citric acid, phosphoric acid, ascorbic acid, as well as various other acids and synergistic compounds described in the prior art.

In amplification of the fats and oils mentioned above which can be stabilized by the antioxidants of our invention, various representative fats and oils include linseed oil, menhaden oil, cod liver oil, castor oil, olive oil, rape seed oil, coconut oil, palm oil, corn oil, sesame oil, peanut oil, babassu oil, butter fat, lard, beef tallow, etc., as well as hydrogenated oils and fats prepared from any of the foregoing. Furthermore, various other oils and fats may be similarly treated within the scope of the present invention.

Inasmuch as it is well known in the art to employ antioxidants in the stabilization of fats and oils, it is not believed necessary to give numerous specific examples of how the antioxidants of this invention are blended with fats and oils nor the specific proportions which can be employed. The methods of blending antioxidants and synergists with particular fats and oils can be readily determined by those skilled in the art. The range of antioxidant proportions which can be employed is from about 0.001 percent up to as much as 1.0 percent or more by weight of the antioxidants of this invention depending upon the effects desired. Generally, a range of proportions of from about 0.001 percent to about 0.1 percent is advantageous with the upper limit being usually fully satisfactory if it does not exceed 0.05 percent. When solvents are employed in preparing antioxidant solutions, such solvents can be present in an amount just sufficient to dissolve the antioxidant up to any larger amount which may be desired, especially if larger amounts are necessary to fully dissolve other supplementary antioxidants and/or synergists which may be incorporated into the antioxidant solution.

The following tabulation of data is presented in order to show the properties of the compound which is believed to be 2,2-dimethyl-5-hydroxy-6-(1-propenyl)coumaran as compared to two somewhat related compounds wherein the 6-position is occupied by a secondary butyl radical in one instance and a tertiary butyl radical in the second instance. The prior art indicates that these comparative compounds are among the advantageously effective antioxidants described prior to the instant invention. The compound called butylated hydroxyanisole (BHA) in this table is a mixture of the 2- and 3-isomers of monotertiary butyl-4-hydroxyanisole with the 2-isomer predominating. BHA is a well-known commercially available antioxidant used for the stabilization of fats and oils.

| Compound | Concentration | AOM Value in Hours | | |
|---|---|---|---|---|
| | | Lard No. 15 | Lard No. 16 | Lard No. 17 |
| Control | | 14.5 | 10 | 8 |
| BHA | .02 | 26 | 27 | 31 |
| 2,2-dimethyl-5-hydroxy-6-sec-butyl-coumaran | .02 | | | 19 |
| 2,2-dimethyl-5-hydroxy-6-tert-butyl-coumaran | .01 | | 26 | |
| | .02 | | 25 | |
| 2,2-dimethyl-5-hydroxy-6-propenyl-coumaran | 0.01 | 58 | | |
| | 0.02 | 72 | | |

It can be seen from the preceding table that all of the antioxidant compounds set forth therein which were known in the prior art had reasonably good antioxidant properties for the stabilization of lard. The antioxidant of this invention, i. e. 2,2-dimethyl-5-hydroxy-x-(1-propenyl)coumaran (probably the 6-isomer set forth in the above table) is markedly superior to the previously-known antioxidants with which the comparison has been made. In fact the antioxidant of this invention is approximately twice as effective as these previously-known compounds.

The data presented above is based on tests conducted with three samples of commercially available lard identified as samples Nos. 15, 16 and 17. The AOM figures are in hours; the procedure employed under the AOM (active oxygen method) is well known in the antioxidant art and need not be explained in this specification.

In addition to the employment of 2,2-dimethyl-5-hydroxy-x-(1-propenyl)coumaran in the stabilization of fats and oils this antioxidant can also be employed in the stabilization of other organic compounds such as synthetic resins, cracked gasoline, pyrethrums, etc.

The employment of 2,2-dimethyl-5-hydroxy-x-(1-propenyl) coumaran for stabilizing edible fats and oils is especially advantageous since it is relatively insoluble in water but is soluble in various hydrocarbon solvents and in fats and oils. This results in the antioxidant having excellent carry-over properties. In other words, the blending, cooking, packing or other processing operations performed in the preparation of food products has relatively little effect on the antioxidant covered by this application. Due to the resultant carry-over effect, the product obtained has improved shelf life.

We claim:
1. A new composition of matter having the following formula

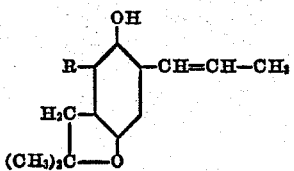

wherein R represents a substituent selected from the group consisting of a hydrogen atom and a 1-propenyl radical.

2. 2,2-dimethyl-5-hydroxy-6-(1-propenyl)coumaran.

3. A process for preparing the composition of matter which is defined in claim 1 which comprises heating a starting material having the following formula:

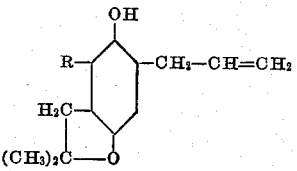

wherein R represents a member selected from the group consisting of a hydrogen atom and an allyl radical, in the presence of an alkali metal hydroxide solution in an inert polar medium under an inert atmosphere at a temperature of from about 110° to about 190° C. whereby a product is produced wherein the allyl radicals present in the starting material have been isomerized to form 1-propenyl radicals.

4. A process for preparing 2,2-dimethyl-5-hydroxy-6-(1-propenyl)-coumaran which comprises heating 2,2-dimethyl-5-hydroxy-6-allylcoumaran in the presence of an alkali metal solution in an inert polar medium under an inert atmosphere at a temperature of about 110° to about 190° C.

5. A process as defined in claim 4 wherein the inert atmosphere is nitrogen and the elevated temperature is about 160° C.

6. A process as defined in claim 5 wherein the inert polar medium is water.

7. Stabilized materials selected from the group consisting of fats and oils containing from about 0.001% to about 1.0% by weight of the composition of matter as defined in claim 1.

8. Stablilized materials selected from the group consisting of fats and oils containing from about 0.001% to about 0.1% by weight of 2,2-dimethyl-5-hydroxy-6-(1-propenyl)coumaran.

9. A process for stabilizing a material selected from the group consisting of fats and oils which comprise adding from about 0.001% to about 1.0% by weight of the composition of matter which is defined in claim 1.

10. A process for stabilizing a material selected from the group consisting of fats and oils which comprises adding from about 0.001% to about 0.1% by weight of 2,2-dimethyl-5-hydroxy-6-(1-propenyl)coumaran.

No references cited.